US012687224B2

(12) United States Patent
    Ono et al.

(10) Patent No.: US 12,687,224 B2
(45) Date of Patent: Jul. 21, 2026

(54) UTILITY VEHICLE

(71) Applicant: Kubota Corporation, Osaka (JP)

(72) Inventors: Toshiki Ono, Sakai (JP); Kazuyuki Tashiro, Sakai (JP)

(73) Assignee: Kubota Corporation, Osaka (JP)

( * ) Notice: Subject to any disclaimer, the term of this patent is extended or adjusted under 35 U.S.C. 154(b) by 288 days.

(21) Appl. No.: 18/566,911

(22) PCT Filed: Feb. 16, 2023

(86) PCT No.: PCT/IB2023/051393
    § 371 (c)(1),
    (2) Date: Dec. 4, 2023

(87) PCT Pub. No.: WO2023/131935
    PCT Pub. Date: Jul. 13, 2023

(65) Prior Publication Data
    US 2024/0369135 A1      Nov. 7, 2024

(30) Foreign Application Priority Data

Jan. 5, 2022     (JP) ................................. 2022-000665

(51) Int. Cl.
    *F01N 5/00*          (2006.01)
    *B60P 1/28*          (2006.01)
                        (Continued)

(52) U.S. Cl.
    CPC ............ *F16H 57/0489* (2013.01); *B60P 1/28* (2013.01); *F01N 5/00* (2013.01); *F01N 13/008* (2013.01);
                        (Continued)

(58) Field of Classification Search
    CPC .... F01N 2590/08; F01N 3/0253; F01N 9/002; F01N 5/00; F01N 13/008;
                        (Continued)

(56) References Cited

U.S. PATENT DOCUMENTS

| | | | |
|---|---|---|---|
| 5,671,820 A * | 9/1997 | Kobayashi ............ | E02F 9/0891 |
| | | | 180/69.21 |
| 7,735,896 B2 * | 6/2010 | Kubota .................. | B60N 2/305 |
| | | | 297/188.1 |
| 8,499,870 B2 * | 8/2013 | Nakamura ............. | B62D 25/10 |
| | | | 180/68.3 |
| 8,973,351 B2 * | 3/2015 | Shibutani .............. | F02D 41/029 |
| | | | 60/285 |

(Continued)

FOREIGN PATENT DOCUMENTS

| | | |
|---|---|---|
| JP | 201251506 A | 3/2012 |
| JP | 201251507 A | 3/2012 |
| JP | 202146081 A | 3/2021 |

*Primary Examiner* — James A Shriver, II
*Assistant Examiner* — Hilary L Johns
(74) *Attorney, Agent, or Firm* — The Webb Law Firm

(57) ABSTRACT

A utility vehicle includes an engine E provided for a body of the utility vehicle; an exhaust section 8 configured to discharge exhaust gas from the engine E; a belt-type continuously variable transmission device 31 configured to receive driving force from the engine E; an exhaust port 40 configured to discharge, from the belt-type continuously variable transmission device 31, cooling air drawn into the belt-type continuously variable transmission device 31 to cool inside of the belt-type continuously variable transmission device 31, the exhaust port 40 being on a first side of the exhaust section 8; and an air guide 41 disposed on a second side of the exhaust section 8 and configured to guide the cooling air from the exhaust port 40 to a cooling target.

7 Claims, 6 Drawing Sheets

(51) Int. Cl.

| | |
|---|---|
| *F01N 13/00* | (2010.01) |
| *F01P 11/16* | (2006.01) |
| *F16H 57/04* | (2010.01) |

(52) U.S. Cl.
CPC .......... *F01P 11/16* (2013.01); *F16H 57/0416* (2013.01); *F01N 2560/025* (2013.01)

(58) Field of Classification Search
CPC ......... F01N 2560/025; F02D 2041/228; F02D 2200/0812; F02D 2200/604; F02D 41/0235; F02D 41/0245; F02D 41/029; F02D 41/062; F02D 41/405; Y02T 10/40; F16H 57/0489; F16H 57/0416; B60P 1/28; F01P 11/16
USPC ........................................................ 180/309
See application file for complete search history.

(56) References Cited

U.S. PATENT DOCUMENTS

| | | | | |
|---|---|---|---|---|
| 9,849,422 | B1 * | 12/2017 | Corliss, II | F02D 41/0235 |
| 10,640,029 | B2 * | 5/2020 | Tashiro | B60P 1/28 |
| 11,434,981 | B2 * | 9/2022 | Oyama | F16H 57/0416 |
| 2012/0055728 | A1 | 3/2012 | Bessho et al. | |
| 2012/0055729 | A1 * | 3/2012 | Bessho | B60K 5/04 |
| | | | | 180/309 |
| 2013/0133315 | A1 * | 5/2013 | Shibutani | F01N 9/002 |
| | | | | 60/311 |
| 2015/0267627 | A1 * | 9/2015 | Vigild | F02D 41/1456 |
| | | | | 73/23.21 |
| 2021/0079985 | A1 * | 3/2021 | Oyama | B60K 11/02 |
| 2021/0270016 | A1 * | 9/2021 | Hyodo | F01M 5/002 |
| 2022/0204098 | A1 * | 6/2022 | Kobayashi | B62D 21/14 |

* cited by examiner

UTILITY VEHICLE

CROSS-REFERENCE TO RELATED APPLICATIONS

This application is the United States national phase of International Application No. PCT/IB2023/051393 filed Feb. 16, 2023, and claims priority to Japanese Patent Application No. 2022-000665 filed Jan. 5, 2022, the disclosures of which are hereby incorporated by reference in their entireties.

BACKGROUND OF THE INVENTION

Field of the Invention

The present invention relates to a utility vehicle including an engine provided for the body and a belt-type continuously variable transmission device configured to receive driving force from the engine.

Description of Related Art

Conventional utility vehicles may, as disclosed in documents such as Patent Literature 1, include a belt-type continuously variable transmission device with an exhaust port for discharging cooling air from inside its case to cool the engine with the cooling air.

PATENT LITERATURE

Patent Literature 1

Japanese Unexamined Patent Application Publication, Tokukai, No. 2021-046081

SUMMARY OF INVENTION

Conventional utility vehicles are simply configured to discharge cooling air through the exhaust port toward the engine, and are not configured to efficiently cool with use of cooling air a component that requires cooling such as a water temperature sensor configured to measure the temperature of cooling air for the engine.

The present invention has an object of providing a utility vehicle configured to not only cool the engine and the exhaust section with use of cooling air from its belt-type continuously variable transmission device, but also efficiently cool with use of the cooling air a cooling target that requires cooling.

A utility vehicle of the present invention includes: an engine provided for a body of the utility vehicle; an exhaust section configured to discharge exhaust gas from the engine; a belt-type continuously variable transmission device configured to receive driving force from the engine; an exhaust port configured to discharge, from the belt-type continuously variable transmission device, cooling air drawn into the belt-type continuously variable transmission device to cool inside of the belt-type continuously variable transmission device, the exhaust port being on a first side of the exhaust section; and an air guide disposed on a second side of the exhaust section and configured to guide the cooling air from the exhaust port to a cooling target.

The present invention is configured such that the air guide guides cooling air to a cooling target to cool the cooling target efficiently. Specifically, the present invention is capable of not only cooling the exhaust section, which becomes heated as a result of passage of exhaust gas from the engine, with use of cooling air from the belt-type continuously variable transmission device, but also cooling another cooling target efficiently.

The present invention may preferably further include: a vertically swingable carrier box provided for the body, wherein the exhaust port is below the carrier box, and the air guide includes: a first air guide plate held by the body; and a second air guide plate held by the carrier box.

With the above configuration, the air guide includes a first air guide plate and a second air guide plate. As compared to the case of the air guide including a single plate-shaped member, the first and second air guide plates are small, and are unlikely to break or deform. Further, the first and second air guide plates are held by the body and the carrier box, respectively, meaning that the first and second air guide plates are close to the body and the carrier box. This allows the first and second air guide plates to be each attached with use of a compact attachment member.

The present invention may preferably be further configured such that the second air guide plate is backward of the first air guide plate and aligned with the first air guide plate in a front-back direction relative to the body, and the second air guide plate has a back portion in a form of an inclined portion inclined toward the exhaust port as the inclined portion extends backward relative to the body.

With the above configuration, the first and second air guide plates are capable of receiving cooling air discharged through the exhaust port similarly to the case of the air guide including a single large air guide plate, and are thereby capable of guiding more cooling air to a cooling target. While the utility vehicle traveling causes air to flow from forward to backward, the inclined portion guides the air to the exhaust port to further cool the exhaust section with the air.

The present invention may preferably be further configured such that the first air guide plate is in a form of a metal plate, and the second air guide plate is made of a flexible material.

With the above configuration, the first air guide plate, which is held by the body, is in the form of a firm metal plate. Even if a swing of the carrier box causes the first air guide plate, for example, to collide with the second air guide plate, the collision will not easily deform or break the second air guide plate, as the second air guide plate is made of a flexible material, and will not deform or break the first air guide plate.

The present invention may preferably be further configured such that the engine is provided with a water temperature sensor disposed on a side of the engine which side faces the exhaust section and configured to measure a temperature of cooling water for the engine, and the cooling target is the water temperature sensor.

The above configuration effectively cools a water temperature sensor on the side of the exhaust section, which becomes heated.

The present invention may preferably be further configured such that the exhaust section is provided with an oxygen concentration sensor configured to measure a concentration of oxygen in the exhaust gas from the engine, and the cooling target is the oxygen concentration sensor.

The above configuration effectively cools an oxygen concentration sensor provided for the exhaust section, which becomes heated.

DESCRIPTION OF THE INVENTION

Figure 1:
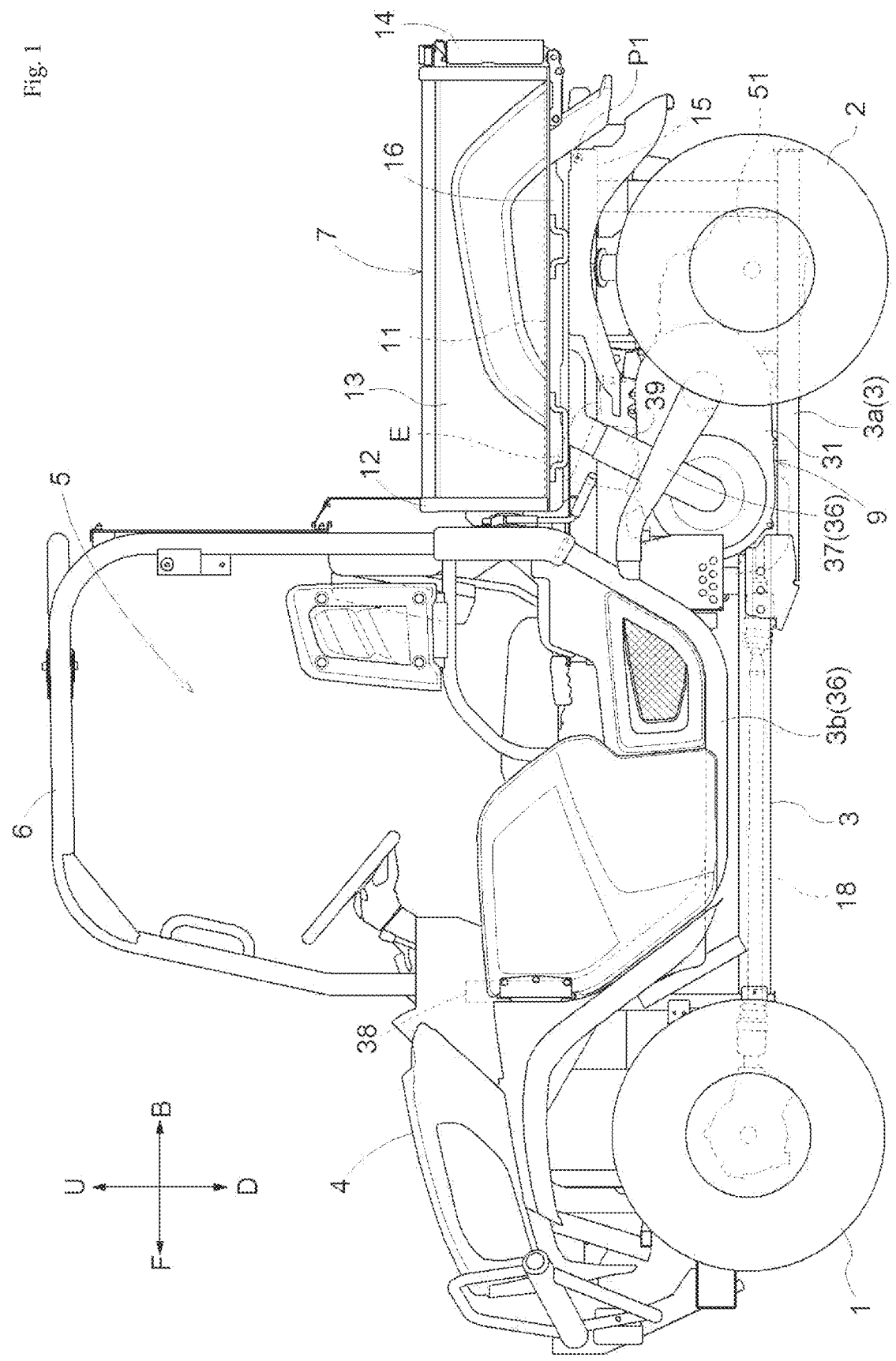
FIG. 1 is a left side view of a utility vehicle.

The description below deals with an embodiment of the present invention with reference to drawings. Unless otherwise specified, the description below uses terms such as "front" and "forward" to refer to the direction indicated with arrow F in the drawings, terms such as "back" and "backward" to refer to the direction indicated with arrow B in the drawings, terms such as "left" and "leftward" to refer to the direction indicated with arrow L in the drawings, terms such as "right" and "rightward" to refer to the direction indicated with arrow R in the drawings, terms such as "above" and "upward" to refer to the direction indicated with arrow U in the drawings, and terms such as "below" and "downward" to refer to the direction indicated with arrow D in the drawings.

[Overall Configuration of Utility Vehicle]

The description below deals with a utility vehicle as the present embodiment. As illustrated in FIG. 1, the utility vehicle includes a body, left and right front wheels 1 provided for the body as travel devices, left and right rear wheels 2 provided for the body as travel devices, and a body frame 3. The front wheels 1 are turnable and drivable, and are held by a front portion of the body frame 3. The rear wheels 2 are drivable, and are held by a back portion of the body frame 3.

The utility vehicle includes a front lid 4 disposed at a front portion of the body and covering, for example, a front portion of the body frame 3 from above.

The utility vehicle includes a driver section 5 disposed between the front wheels 1 and the rear wheels 2 and configured to accommodate a driver. The driver section 5 includes a ROPS 6 that defines a driver's space. The utility vehicle includes a vertically swingable carrier box 7 backward of the driver section 5.

[Configuration of Carrier Box]

As illustrated in FIG. 1, the carrier box 7 includes a bottom plate 11, a front wall 12, left and right side walls 13, and a back wall 14.

The utility vehicle includes under the carrier box 7 left and right support frame members 15 extending in the front-back direction. The utility vehicle includes a support member 16 supporting the bottom plate 11 and provided with a bracket 16*a* (see FIG. 3) coupled to a back portion of the support member 16 and swingable about a lateral axis P1 for the support frame members 15. The carrier box 7 is thereby supported in such a manner as to be swingable about a lateral axis P1 at a back portion of the carrier box 7 between a lower position and an upper position, at which the carrier box 7 is lifted (see FIG. 3).

[Configuration of Engine]

The utility vehicle includes under the carrier box 7 an engine E held by the body, an exhaust section 8 (see FIG. 3) configured to discharge exhaust gas from the engine E, and a power transmitter 9 configured to transmit motive power from the engine E to the front and rear wheels 1 and 2.

The engine E is disposed over left and right rear frame members 3*a* included in the body frame 3 at a back portion thereof. The engine E has an upper lateral side portion provided with a water temperature sensor S1 configured to measure the temperature of cooling water for the engine E.

[Configuration of Exhaust Section]

Figure 3:
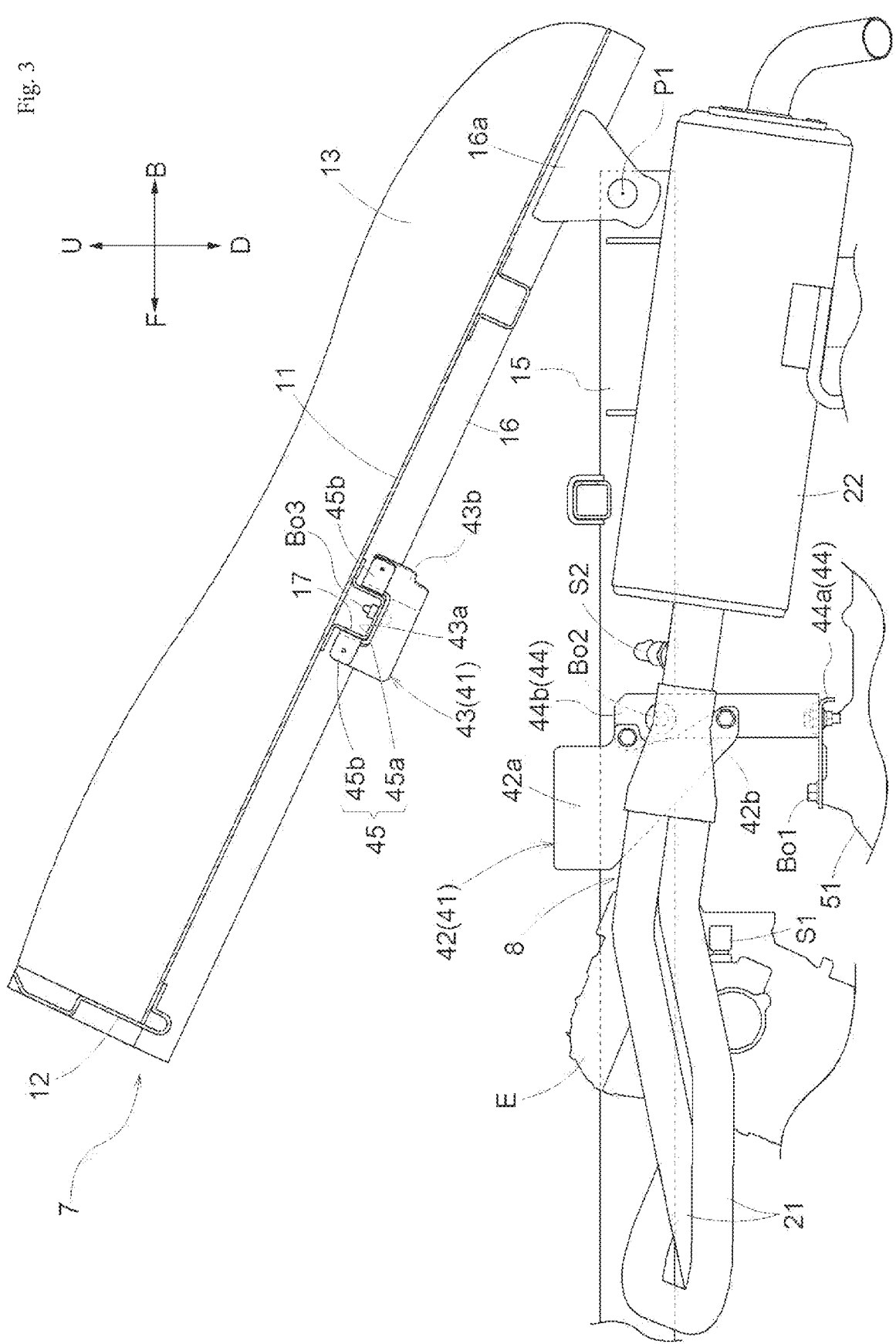
FIG. 3 is a left side view of an air guide.

As illustrated in FIG. 3, the exhaust section 8 includes exhaust pipes 21 connected to a front portion of the engine E and an exhaust muffler 22 connected to the exhaust pipes 21. The exhaust pipes 21 bend to the left and extend backward past a space to the left of the engine E. The exhaust muffler 22 is to the left and backward of the engine E.

The exhaust pipes 21 receive exhaust gas from the engine E and discharge the exhaust gas into the exhaust muffler 22, which muffles the exhaust noise and discharges the exhaust gas into the air. The running engine E discharges high-temperature exhaust gas, which heats the exhaust pipes 21 and the exhaust muffler 22.

[Configuration of Power Transmitter]

As illustrated in FIG. 1, the power transmitter 9 includes a belt-type continuously variable transmission device 31 lateral to the engine E and a transmission case 51 backward of the engine E, held by the body, and containing a gear shift device (not illustrated in the drawings).

Figure 2:
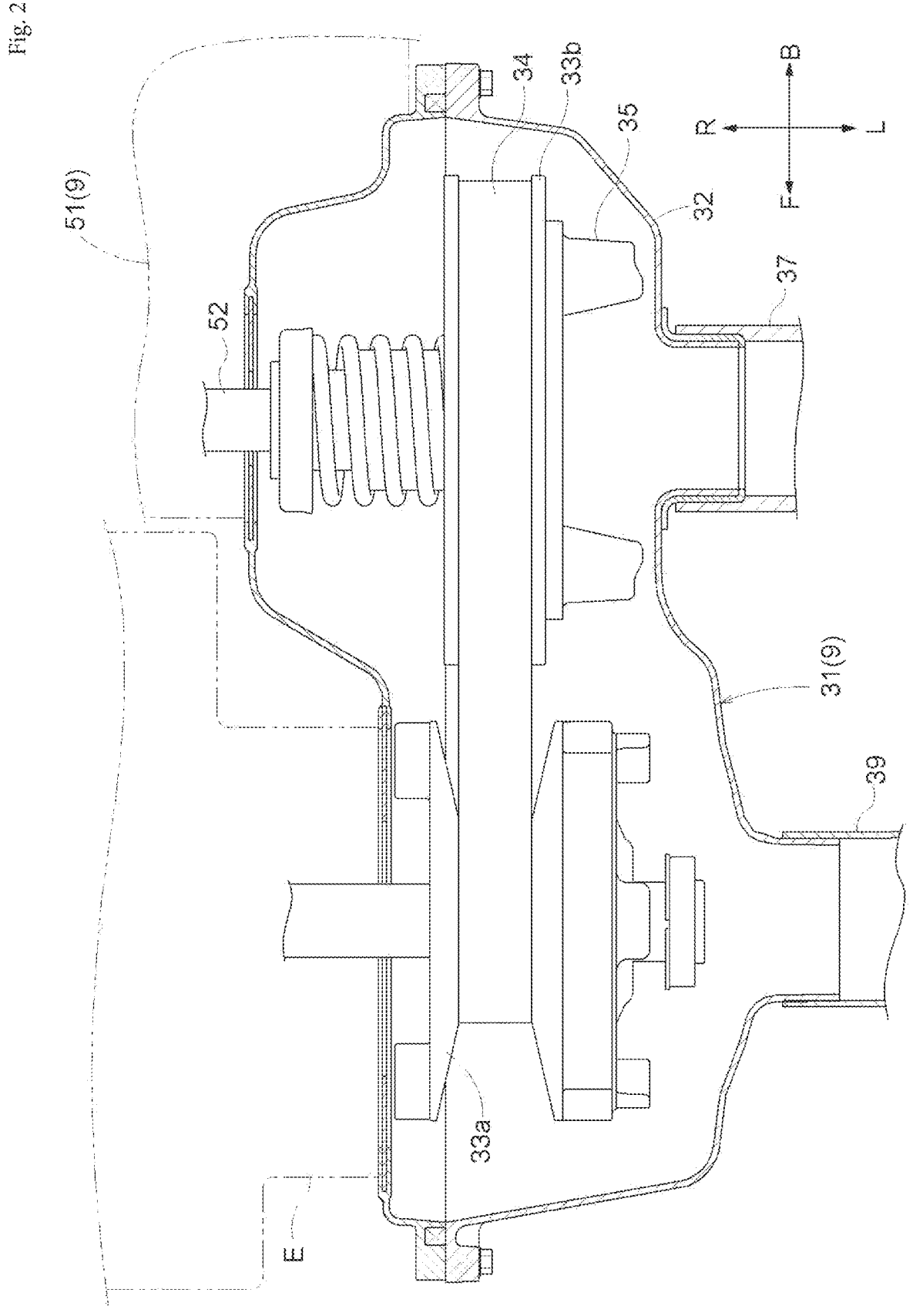
FIG. 2 is a cross-sectional view of a belt-type continuously variable transmission device.
Figure 5:
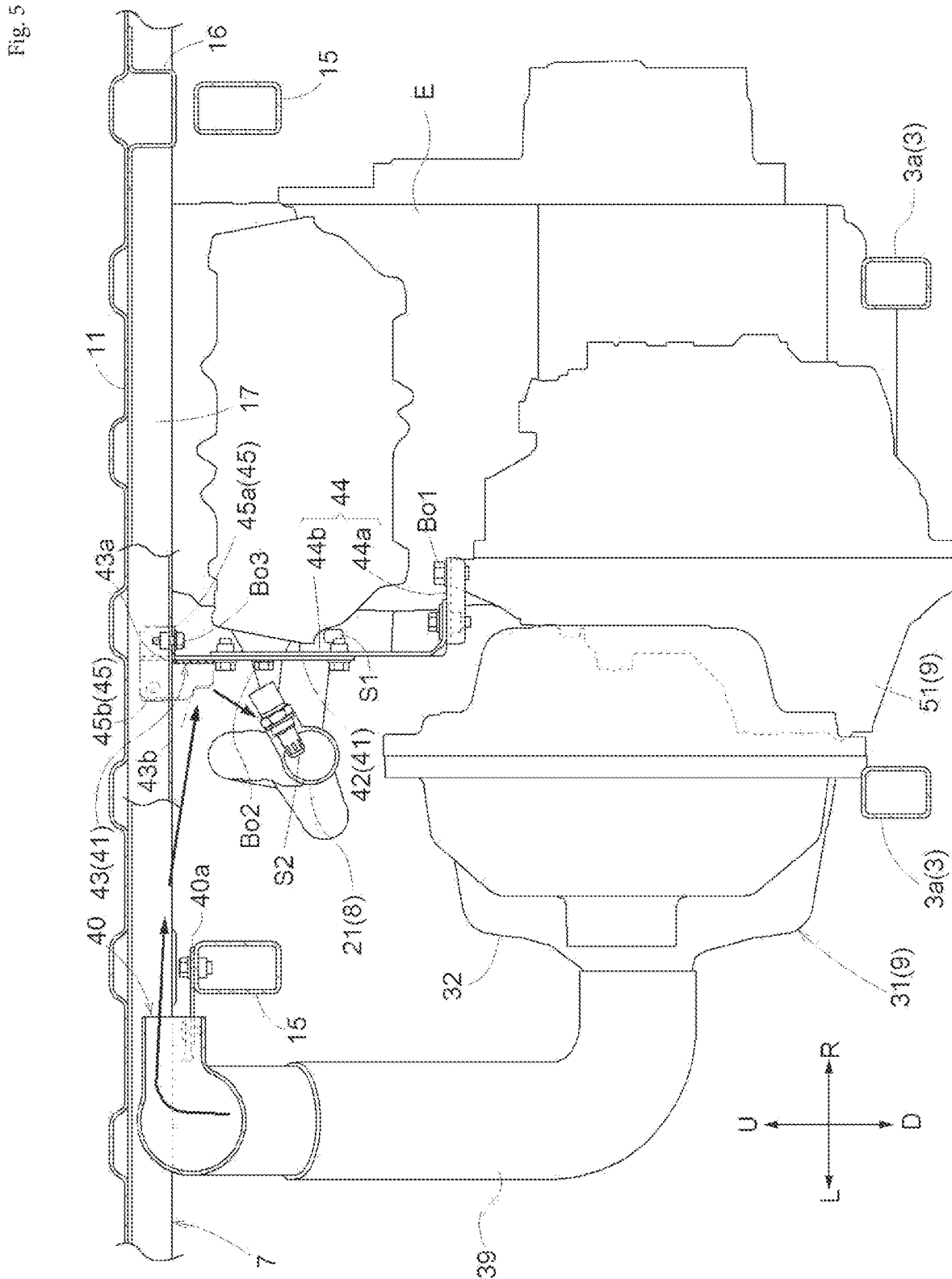
FIG. 5 is a cross-sectional rear view of an air guide.

As illustrated in FIGS. 2 and 5, the belt-type continuously variable transmission device 31 is further on the left side than the exhaust pipes 21. As illustrated in FIG. 2, the belt-type continuously variable transmission device 31 includes a transmission device case 32 containing a belt pulley 33*a* at a front portion of the transmission device case 32, a belt pulley 33*b* at a back portion of the transmission device case 32, and an endless belt 34 around the belt pulleys 33*a* and 33*b*. The belt pulleys 33*a* and 33*b* each include a pair of half pulley bodies, which allows each of the belt pulleys 33*a* and 33*b* to have an adjustable belt winding diameter. The belt-type continuously variable transmission device 31 is configured to adjust the belt winding diameter of each of the belt pulleys 33*a* and 33*b* to vary received motive power and output the varied motive power. The belt-type continuously variable transmission device 31 is configured to receive driving force from the engine E, vary the received motive power steplessly, and output the varied motive power toward the transmission case 51.

The transmission case 51 is configured to receive driving force from the belt-type continuously variable transmission device 31 at its input shaft 52 and transmit the driving force to the rear wheels 2 as well as to the front wheels 1 (see FIG. 1) through a propeller shaft 18 (see FIG. 1).

[Configuration for Cooling Exhaust Section]

As illustrated in FIG. 2, the transmission device case 32 contains a rotary fan 35 integral with one of the half pulley bodies of the belt pulley 33*b* and drivable together with the belt pulley 33*b* in response to the belt pulley 33*b* being driven.

As illustrated in FIG. 1, the utility vehicle includes an air intake duct 36 connected to a back portion of the transmission device case 32. The air intake duct 36 includes a driver section frame section 3*b* provided for a portion of the body frame 3 which portion corresponds to the driver section 5 and a communication pipe 37 for communication between a back end portion of the driver section frame section 3*b* and the transmission device case 32. The driver section frame section 3*b* includes a steel duct, and serves as part of the air intake duct 36. The driver section frame section 3*b* has a front end portion with a cooling air inlet opening 38 inside the space covered by the front lid 4.

The utility vehicle includes an exhaust duct 39 connected to a front portion of the transmission device case 32 and extending upward and backward.

Figure 4:
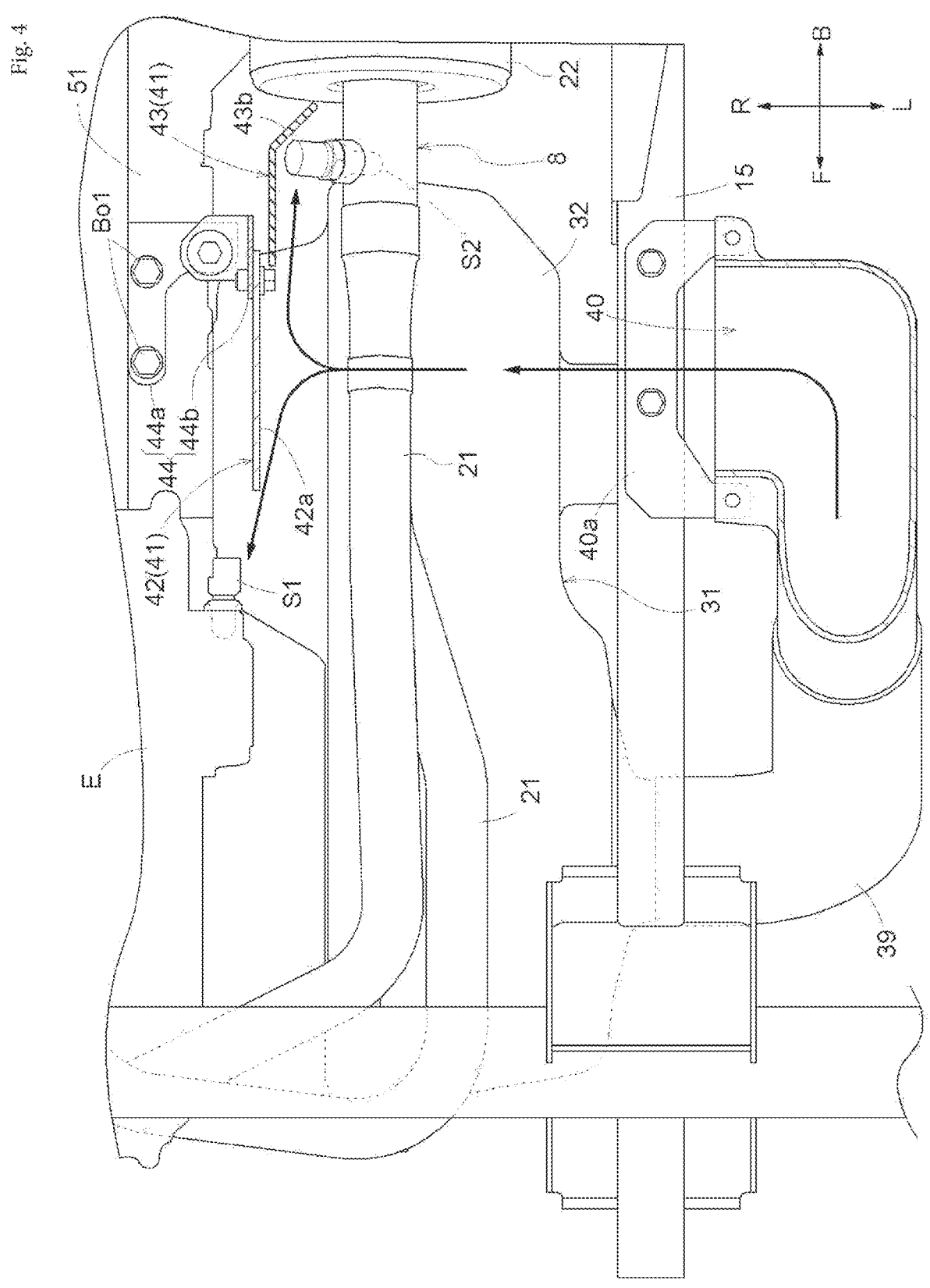
FIG. 4 is a plan view of an air guide.

As illustrated in FIG. 4, the exhaust duct 39 has an exhaust port 40 at an end. The exhaust port 40 for the present embodiment is to the left of and faces the exhaust section 8. The exhaust port 40 is bolted to a support frame member 15 with a fixing member 40*a* in-between.

The rotary fan 35 rotates to generate suction force, which draws in air from the space covered by the front lid 4 through the inlet opening 38. The air flows through the air intake duct 36 and the communication pipe 37 into the transmission device case 32, which generates cooling air inside the transmission device case 32. The cooling air cools the belt-type continuously variable transmission device 31. The rotary fan 35 rotates to generate blowing force, which causes the cooling air generated inside the belt-type continuously variable transmission device 31 to be, after cooling the belt-type continuously variable transmission device 31, guided by the exhaust duct 39 to the exhaust port 40 to be discharged from the belt-type continuously variable transmission device 31. The cooling air discharged through the exhaust port 40 cools the exhaust section 8.

[Configuration of Air Guide]

As illustrated in FIGS. 3 and 4, the present embodiment includes an air guide 41 disposed to the right of the exhaust section 8 and configured to guide cooling air from the exhaust port 40 to a cooling target.

Figure 6:
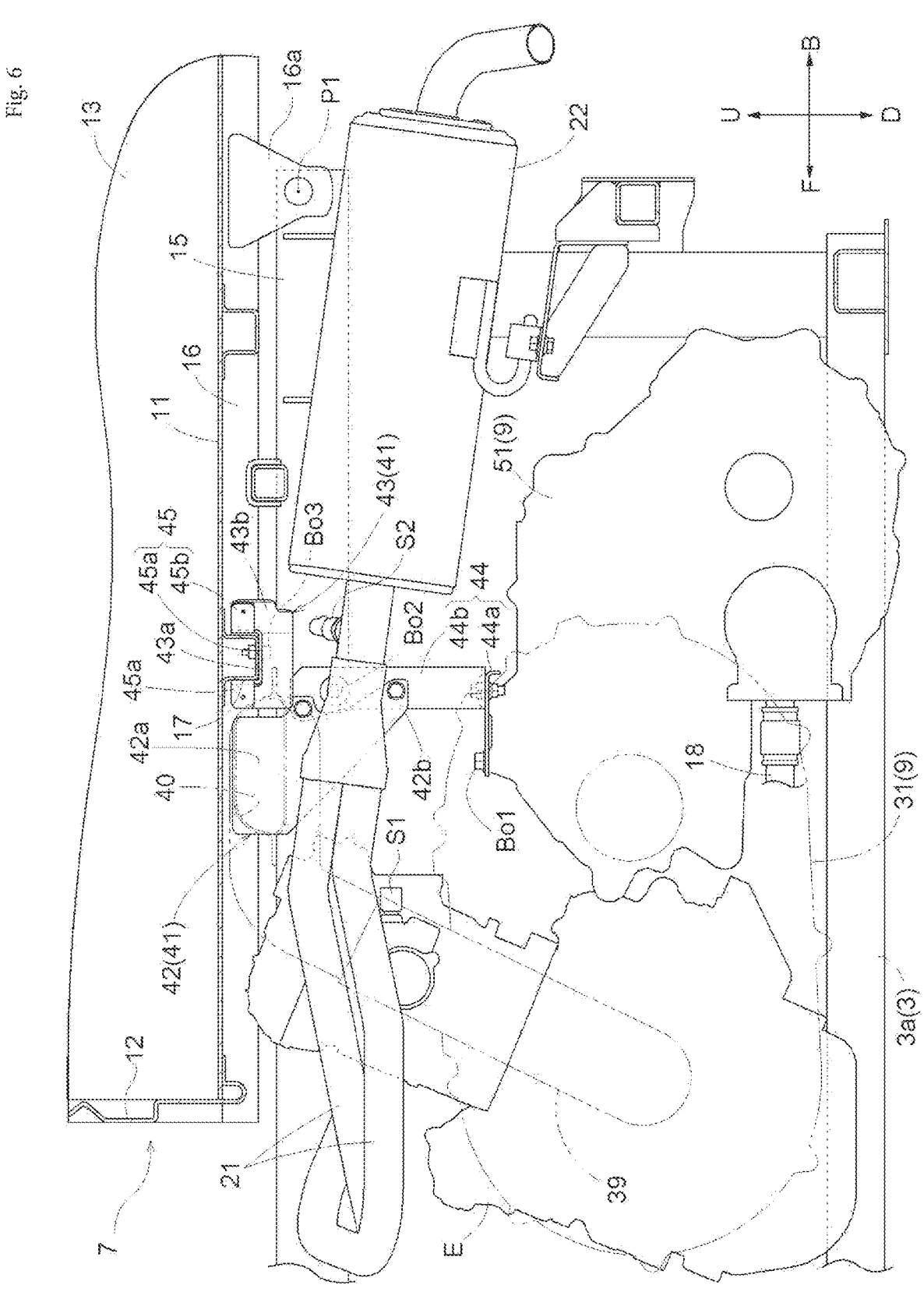
FIG. 6 is a left side view of an engine, an exhaust section, a power transmitter, and an air guide.

The present embodiment is configured such that the air guide 41 includes a first air guide plate 42 held by the body and a second air guide plate 43 held by the carrier box 7. As illustrated in FIG. 6, the first and second air guide plates 42 and 43 coincide with the exhaust port 40 in a side view.

The first air guide plate 42 is in the form of a metal plate. The first air guide plate 42 includes a substantially rectangular main section 42*a* at an upper portion and a fixing section 42*b* continuous with a lower portion of the first air guide plate 42. The fixing section 42*b* tapers downward such that an edge thereof opposite to the second air guide plate 43 is inclined toward the second air guide plate 43 as the edge extends downward.

As illustrated in FIGS. 3 and 5, the first air guide plate 42 is held by the body with the engine E and the transmission case 51 in-between. Specifically, while the utility vehicle includes a holder 44 including a lower holder member 44*a* and a vertical holder member 44*b*, the first air guide plate 42 is held by the engine E and the transmission case 51 with use of the lower and vertical holder members 44*a* and 44*b*. The lower holder member 44*a* is fastened to a top portion of the engine E with use of a bolt Bo1. The vertical holder member 44*b* is bolted to the upper face of the lower holder member 44*a*, and extends upward. The vertical holder member 44*b* is fastened at an upper portion to a side wall of the engine E with use of a bolt Bo2. The first air guide plate 42 is bolted at the fixing section 42*b* to the vertical holder member 44*b*.

The first air guide plate 42 extends in the front-back direction and up-down direction relative to the body. The water temperature sensor S1 is on a side of the engine E which side faces the exhaust section 8. The first air guide plate 42 is configured to, as indicated in FIG. 4 with arrows, guide cooling air from the exhaust port 40 toward the water temperature sensor S1 as a cooling target. This configuration efficiently cools the water temperature sensor S1, which includes electronic components.

The second air guide plate 43 is backward of the first air guide plate 42 and aligned with the first air guide plate 42 in the front-back direction relative to the body. The second air guide plate 43 is made of a flexible material such as rubber.

The utility vehicle includes a lateral frame member 17 disposed under the carrier box 7, extending laterally relative to the body, and supporting the bottom plate 11 of the carrier box 7. The second air guide plate 43 is held by the lateral frame member 17, and is fixed thereto with an attachment member 45 in-between. The attachment member 45 includes an attachment section 45*a* in a U shape corresponding to the shape of the lateral frame member 17.

The attachment member 45 is, with the attachment section 45*a* fitted with the lateral frame member 17, fastened to the lateral frame member 17 with use of a bolt Bo3 through the U shape bottom. The attachment member 45 includes two plate-shaped supports 45*b* extending from the respective opposite vertical portions of the U-shaped attachment section 45*a* in a direction perpendicular to the width direction of the attachment section 45*a*, that is, to the direction in which the lateral frame member 17 extends.

The second air guide plate 43 has an upper portion with a cutout 43*a* corresponding in shape to the attachment section 45*a*. The second air guide plate 43 is held by the lateral frame member 17 of the carrier box 7 with the attachment member 45 in-between, as the supports 45*b* hold those portions of the second air guide plate 43 which are laterally adjacent to the cutout 43*a*.

The second air guide plate 43 has a front portion extending in the front-back direction and the up-down direction and a back portion in the form of an inclined portion 43*b* inclined toward the exhaust port 40 as the inclined portion 43*b* extends backward relative to the body. The exhaust section 8 is provided with an oxygen concentration sensor S2 configured to measure the concentration of oxygen in exhaust gas from the engine E. The inclined portion 43*b* of the second air guide plate 43 is configured to, as indicated in FIGS. 4 and 5 with arrows, guide cooling air from the exhaust port 40 toward the oxygen concentration sensor S2 as a cooling target. This configuration efficiently cools the oxygen concentration sensor S2, which includes electronic components.

ALTERNATIVE EMBODIMENTS

The description below deals with example alternatives to the embodiment described above.

(1) The embodiment described above is an example in which the exhaust port 40 is to the left of the exhaust section 8, and the air guide 41 is to the right of the exhaust section 8. The present invention is, however, simply configured such that the exhaust port 40 is on one side of the exhaust section 8 and that the air guide 41 is on the other side of the exhaust section 8. The embodiment described above may thus be altered, for instance, such that the exhaust port 40 is to the right of the exhaust section 8 and that the air guide 41 is to the left of the exhaust section 8.

(2) The embodiment described above is an example in which the air guide 41 includes two plate-shaped members, namely a first air guide plate 42 and a second air guide plate 43. The present invention is, however, not limited to such an embodiment. The air guide 41 may alternatively include a single plate-shaped member or three or more plate-shaped members.

(3) The embodiment described above is an example in which the first air guide plate 42 is held by the body with the engine E and the transmission case 51 in-between and that the second air guide plate 43 is held by the carrier box 7. The present invention is, however, not limited to such an embodiment. The embodiment described above may be altered, for instance, such that the first and second air guide plates 42 and 43 are both held by the body or another component such as the exhaust section 8.

(4) The embodiment described above is an example in which the first air guide plate 42 is in the form of a metal plate, and the second air guide plate 43 is made of a flexible material such as rubber. The present invention is, however, not limited to such an embodiment. The embodiment described above may be altered, for instance, such that the first and second air guide plates 42 and 43 are both made of a flexible material.

(5) The embodiment described above involves a water temperature sensor S1 and an oxygen concentration sensor S2 as cooling targets. The present invention is, however, not limited to such an embodiment. The embodiment described above may be altered, for instance, to involve another sensor as a cooling target, or to guide cooling air from the exhaust port 40 to the engine E as a cooling target.

The arrangements disclosed for the above embodiments (including the alternative embodiments; hereinafter the same applies) may each be combined with an arrangement disclosed for another embodiment, as long as such a combination does not cause a contradiction. Further, the embodiments disclosed in the present specification are mere examples. The present invention is not limited to those embodiments, and may be altered as appropriate, as long as such an alteration does not result in a failure to attain an object of the present invention.

INDUSTRIAL APPLICABILITY

The present invention is applicable to any utility vehicle for use in, for example, carrying people and goods and in recreation.

REFERENCE SIGNS LIST

7 Carrier box
8 Exhaust section
31 Belt-type continuously variable transmission device
40 Exhaust port
41 Air guide
42 First air guide plate
43 Second air guide plate
43b Inclined portion
S1 Water temperature sensor
S2 Oxygen concentration sensor
E Engine

The invention claimed is:

1. A utility vehicle, comprising:
an engine provided for a body of the utility vehicle;
an exhaust section configured to discharge exhaust gas from the engine;
a belt-type continuously variable transmission device configured to receive driving force from the engine;
an exhaust port configured to discharge, from the belt-type continuously variable transmission device, cooling air drawn into the belt-type continuously variable transmission device to cool inside of the belt-type continuously variable transmission device,
wherein the exhaust port is on a first side of the exhaust section;
wherein an air guide is disposed on a second side of the exhaust section and configured to guide the cooling air from the exhaust port to a cooling target; and
wherein the air guide comprises a first guide plate and a second guide plate aligned in a front-back direction relative to the body.

2. The utility vehicle according to claim 1, further comprising:
a vertically swingable carrier box provided for the body,
wherein the exhaust port is below the carrier box,
wherein the first air guide plate is held by the body, and
wherein the second air guide plate is held by the carrier box.

3. The utility vehicle according to claim 2, wherein:
the second air guide plate is backward of the first air guide plate, and
the second air guide plate has a back portion in a form of an inclined portion inclined toward the exhaust port as the inclined portion extends backward relative to the body.

4. The utility vehicle according to claim 2, wherein:
the first air guide plate is in a form of a metal plate, and
the second air guide plate is made of a flexible material.

5. The utility vehicle according to claim 1, wherein:
the engine is provided with a water temperature sensor disposed on a side of the engine which side faces the exhaust section and configured to measure a temperature of cooling water for the engine, and
the cooling target is the water temperature sensor.

6. The utility vehicle according to claim 1, wherein:
the exhaust section is provided with an oxygen concentration sensor configured to measure a concentration of oxygen in the exhaust gas from the engine, and
the cooling target is the oxygen concentration sensor.

7. A utility vehicle, comprising:
an engine provided for a body of the utility vehicle;
an exhaust section configured to discharge exhaust gas from the engine;
a belt-type continuously variable transmission device configured to receive driving force from the engine;
an exhaust port configured to discharge, from the belt-type continuously variable transmission device, cooling air drawn into the belt-type continuously variable transmission device to cool inside of the belt-type continuously variable transmission device,
wherein the exhaust port is on a first side of the exhaust section;
wherein an air guide is disposed on a second side of the exhaust section and configured to guide the cooling air from the exhaust port to a cooling target;
wherein the utility vehicle further comprises:
a vertically swingable carrier box provided for the body,
wherein the exhaust port is below the carrier box, and
wherein the air guide comprises:
a first air guide plate held by the body; and
a second air guide plate held by the carrier box.

* * * * *